Figure 1:
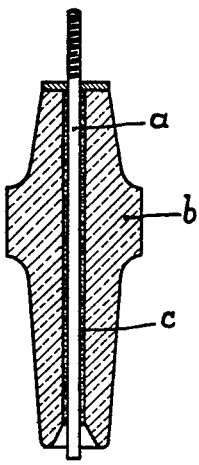

Dec. 11, 1934.　　　A. MÖHRLE　　　1,984,313
SPARKING PLUG
Filed May 31, 1933

Inventor
Artur Möhrle
by Steward & McKay
his attorneys

Patented Dec. 11, 1934

1,984,313

UNITED STATES PATENT OFFICE 1,984,313

SPARKING PLUG

Artur Möhrle, Stuttgart, Germany, assignor to Robert Bosch Aktiengesellschaft, Stuttgart, Germany Application May 31, 1933, Serial No. 673,753
In Germany June 24, 1932

12 Claims. (Cl. 123—169)

The present invention relates to sparking plugs.

The electrodes of sparking plugs are, as is well-known, cemented in the insulating body of the plug, after which the plug is subjected to a drying operation to effect the drying and hardening of the cement. This drying operation hitherto always required a very long time, because the cements hitherto employed only set very slowly and dry with difficulty. It has been found that the drying begins at the places with which the air comes in contact, whereupon the resulting impermeable crust prevents the further drying, so that the cement still remains soft for a very long time at the places excluded from the air. In order to accelerate the operation of the setting and drying, recourse is usually had to heating. Nevertheless, the drying with the use of heat at the temperatures usual at present still requires one or several days so that the cost of manufacture of the sparking plugs is substantially increased. An increase of the usual drying temperatures is not possible, because otherwise the still soft cement is driven out of the insulating body owing to the evaporation of its water content.

The object of the present invention is to enable the cementing operation, in the manufacture of sparking plugs, to be accelerated by reducing the period of time required for drying of the cement.

A further object is to provide an improved joint or union between the insulator and electrode of a sparking plug.

The present invention resides in the fact that in the cementing of the electrodes in the insulating body of a sparking plug, ceramic cement pastes are employed which set rapidly even when air is excluded, and the water-content of which is entirely or mostly chemically combined in the reaction of the cement materials. Such a cement has the great advantage in the manufacture of sparking plugs that the setting and hardening of the cement takes place uniformly and quickly at all points of the long and narrow cement joint which surrounds the electrodes, and that the set cement contains only small remains of moisture which can be removed by a short heating without the already hardened cement being endangered by driving out the water.

The invention is preferably carried out by employing one of the known quick-setting water-glass cement pastes, such as have been hitherto proposed only for the manufacture of acid-resisting masonry. These known cement pastes consist, for instance, of a water-glass solution and hydrated silicic acid of natural occurrence, for example, ground or powdered flint, to which, if desired, silico-fluoride or other silicon compounds are also added for the purpose of increasing the reaction capacity.

Figure 2:
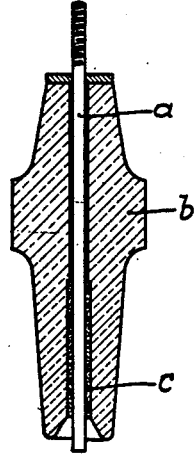

In the accompanying drawing, Figs. 1 and 2 show in longitudinal section two forms of a central electrode assembly of a sparking plug embodying this invention wherein $b$ is the insulating body having an axial aperture therein for reception of an electrode $a$ secured in said aperture by ceramic cement $c$.

I declare that what I claim is:

1. In a sparking plug, an insulating body, an electrode, and a heat-resisting water glass cement which sets relatively quickly even when substantially out of contact with air, securing said electrode in said insulating body.

2. In a sparking plug, an insulating body, an electrode, and a heat-resisting ceramic cement consisting of water glass and hydrated silicic acid, securing said electrode in said insulating body.

3. In a sparking plug, an insulating body, an electrode, and a heat-resisting ceramic cement consisting of water glass and divided flint, securing said electrode in said insulating body.

4. In a sparking plug, an insulating body, an electrode, a heat-resisting ceramic cement, of which the water content is at least mostly in chemical combination, securing said electrode in said insulating body.

5. In a sparking plug, an insulating body, an electrode, a heat-resisting ceramic cement containing cementitious, alkali-neutralising material, securing said electrode in said insulating body.

6. In a sparking plug, an insulating body, an electrode, a heat-resisting ceramic cement containing a highly reactive siliceous material, securing said electrode in said insulating body.

7. In a sparking plug, an insulating body, an electrode, a heat-resisting ceramic cement containing a silico-fluoride, securing said electrode in said insulating body.

8. In a sparking plug, an insulating body, an electrode, a heat-resisting ceramic cement consisting of water glass, natural hydrated silicic acid and a silico fluoride, securing said electrode in said insulating body.

9. In the manufacture of sparking plugs, the step of securing an electrode in an insulating body by the use of a heat-resisting ceramic cement, of which the water content at least mostly enters into chemical combination during the setting of the cement.

10. In the manufacture of sparking plugs, the step of securing an electrode in an insulating body by the use of a heat-resisting ceramic cement consisting of water glass and hydrated silicic acid.

11. In the manufacture of sparking plugs, the step of securing an electrode in an insulating body by the use of a heat-resisting ceramic cement containing cementitious alkali-neutralising material.

12. In the manufacture of sparking plugs, the step of securing an electrode in an insulating body by the use of a heat-resisting ceramic cement containing a highly reactive siliceous material.

ARTUR MÖHRLE.